(12) United States Patent
Welter et al.

(10) Patent No.: US 6,293,993 B1
(45) Date of Patent: Sep. 25, 2001

(54) METHOD FOR RECYCLING BRASS FOUNDRY WASTE

(75) Inventors: Jean-Marie Welter, Gisors; Florence Revet, Serifontaine, both of (FR)

(73) Assignee: Trefimetaux, Courbevoie (FR)

( * ) Notice: Subject to any disclaimer, the term of this patent is extended or adjusted under 35 U.S.C. 154(b) by 0 days.

(21) Appl. No.: 09/402,483

(22) PCT Filed: Apr. 10, 1998

(86) PCT No.: PCT/FR98/00738

§ 371 Date: Dec. 8, 1999

§ 102(e) Date: Dec. 8, 1999

(87) PCT Pub. No.: WO98/48065

PCT Pub. Date: Oct. 29, 1998

(30) Foreign Application Priority Data

Apr. 17, 1997 (FR) .................................................. 97 04987

(51) Int. Cl.⁷ ...................................................... C22B 1/14
(52) U.S. Cl. ................ 75/640; 75/655; 148/553
(58) Field of Search ............... 75/305, 324, 640, 75/655; 148/679, 553, 434

(56) References Cited

U.S. PATENT DOCUMENTS

| | | | | |
|---|---|---|---|---|
| 1,168,401 | * | 1/1916 | Kippe | 75/324 |
| 2,701,194 | * | 2/1955 | Deterding | 75/655 |
| 3,909,243 | * | 9/1975 | McKewan | 75/655 |
| 3,963,526 | * | 6/1976 | Lunn | 148/679 |
| 4,802,916 | * | 2/1989 | Victorovich et al. | 75/640 |

FOREIGN PATENT DOCUMENTS

| | | | | |
|---|---|---|---|---|
| 562488 | * | 5/1958 | (BE) . | |
| 630047 | * | 7/1963 | (BE) . | |
| 651529 | * | 9/1937 | (DE) . | |
| 2941225 | * | 4/1981 | (DE) | 75/640 |
| 794923 | * | 5/1958 | (GB) | 75/324 |
| 1337216 | * | 11/1973 | (GB) | 75/640 |
| 56-000238 | * | 1/1981 | (JP) | 75/655 |

OTHER PUBLICATIONS

Moesta, H., "Erze und Metalle–ihre Kulturgeschichte in Experiment", Springer–Verlag, 1983, pp. 71–75.*

*Gmelins Handbuch der Anorganischen Chemie,* Kupfer Teil A–Lieferung 1, System Nummer 60, Verlag Chemie gMBH, 1955, pp. 21–22.*

Grothe, H., "Uber die Herstellung von Messing nach dem alten Galmeiverfahren", *Erzemetall,* v. 24, No. 12, 1971, pp. 587–592.*

* cited by examiner

*Primary Examiner*—George Wyszomierski
(74) *Attorney, Agent, or Firm*—Dennison, Scheiner, Schultz & Wakeman

(57) ABSTRACT

A recycling process for zinc-rich solid waste containing zinc oxide, Cu oxides and impurities normally present in brass, in which a mixture is formed containing the waste with a finely divided solid reducing agent and a binder, and the mixture is compacted as agglomerates with open pores. The agglomerates are added into a treatment reactor containing a bath of liquid copper or brass metal, in which the zinc and copper oxides are reduced, to obtain in the treatment reactor after the reduction, a new brass in liquid form and a new waste. The new liquid brass is transferred into a fusion and casting furnace, in which its composition is optionally adjusted, and the new liquid brass is cast to form a product. Any waste present in the treatment reactor and the casting furnace are recycled using this process.

19 Claims, 3 Drawing Sheets

METHOD FOR RECYCLING BRASS FOUNDRY WASTE

FIELD OF THE INVENTION

The invention relates to the domain of recycling brass foundry waste. More particularly, the invention relates to a pyrometallurgical recycling process for zinc-rich dross and dust that also contain copper, and involving a compaction step.

DESCRIPTION OF RELATED

Pyrometallurgical processes for processing waste containing zinc, largely in oxide form, are already known. These processes are designed mainly for applications such as recycling iron-rich steelworks fines, or chlorine-rich household waste. In all cases, there is a reduction step in which zinc is released in vapor form. This reduction takes place either entirely in the solid phase, the temperature of the material to be treated being increased in a reducing atmosphere in a sintering furnace or a fluidized bed furnace, or with a pre-reduction step in the solid phase followed by a fusion step, the material previously being agglomerated in the form of pellets with a reducing agent and a flux and then put back into a blast furnace. In all cases, the zinc is recovered by vaporization and condensation either in the form of pure zinc or in the form of compounds (oxides, chlorides, etc.). These processes are capable of separating the various metallic elements (iron, lead, cadmium, etc.) present in the waste.

Furthermore, calamine (zinc ore containing blende (ZnS), zinc carbonate ($SnCO_3$) and zinc oxide (ZnO) have been used to make brass ever since ancient times. This was done using the cementation process called the "calamine process". This process was first described by Pseudo-Aristotle in 300 BC in "Mirabiles Auscultationes", and later by Pliny and Discoride in the first century AD.

In this process, finely ground calamine is mixed with ground charcoal. An organic binder (urine, rice water, resin, tallow, salt, etc.) is added and the preparation is usually agglomerated in pellets. In ancient times, this mix was then made to react with pure divided copper for very long periods, between 8 and 24 hours. This resulted in a brass that typically contained less than 30% of zinc. This process has no longer been used since the beginning of the last century, when brass was made from metallic copper and zinc. Recent texts by authors such as Rolandi and Scacciati (1956), and Werner (1970), have described attempts to simulate the process described above at temperatures below 1050° C., to avoid zinc losses by vaporization. These tests in the solid state form the state of the art.

There are two different sources of brass foundry waste. The first is formation of dross on the surface of the liquid bath in furnaces containing up to 60% by weight of Zn and more than 10% of Cu. This dross is currently ground on production sites only and then separated by size grading. Large copper-rich fractions are recycled on site. However, small size grading fractions called "fines" with a low copper content are sent and treated in specialized companies. The second source is the recovery of flue-dust in foundry intake system filters, composed essentially of zinc oxide with up to 80% by weight of Zn, and also containing between 2 and 20% of Cu. This flue-dust is also treated on specialized sites.

However, this waste that cannot be recovered by the foundries that generate it, is not sufficiently rich in copper to be attractive in copper recovery systems, and it contains too much copper for conventional systems for recycling waste containing zinc. Therefore, it is becoming more and more difficult to find industries interested in their recovery. Furthermore, most treatment sites use hydrometallurgical processes that generate effluents that are highly noxious for the environment.

Finally, these fines and flue-dust require more and more particular precautions for transport (powder and polluting materials), to satisfy increasingly severe regulations. This is even more of a nuisance since treatment plants are frequently built in a different country and consequently different types of legislations are applicable, requiring a variety of authorization requests.

Therefore, the applicant has searched for and developed a process to:
- economically and ecologically recycle fines and flue-dust generated by brass foundries;
- preferably, be able to perform this recycling on the site on which the waste is produced, in order to eliminate risks due to long distance transport;
- reuse the waste in brass production.

SUMMARY OF THE INVENTION

The purpose of the invention is a process for recycling waste (dross, flue-dust, etc.) generated in brass foundries in order to recover metal contained in this waste (Cu, Zn) on the site on which this waste is generated, and their reinjection into the brass production process.

In the process according to the invention, recycling of zinc-rich solid waste (typically dross and flue-dust) mainly in the form of zinc oxide, and containing Cu oxides and impurities normally present in brass and generated in brass foundries:

a) the said waste is mixed with a finely divided solid reducing agent and a binder;

b) the said mix is compacted in agglomerates with open pores;

c) the said agglomerates are added into a treatment reactor containing a bath of liquid copper or brass metal, where they are reduced;

d) after the said waste has been reduced, a new brass is formed and the waste generated in the treatment reactor is separated and recovered;

e) the said new liquid brass may then be transferred into a holding and casting furnace, where the proportion of Zn, or any other alloying element (Pb, Sn, Ni, etc.) in the composition of the said brass may be adjusted if necessary to obtain the required product, and waste generated in this furnace is separated and recovered;

f) the brass, possibly after its composition has been adjusted, is then cast by a process capable of producing plates, billets, wires, parts and products with the required dimensions;

g) the said waste recovered in steps d and e is recycled according to steps a to f.

The critical steps of the process are steps a to c, particularly the formation of agglomerates with open pores comprising the said waste, a reducing agent and a binder.

Tests carried out by the applicant have shown the need for this combination of essential means.

In particular, the applicant carried out recycling tests of the said waste directly with a reducing agent, in a liquid metal bath, without forming agglomerates. In this case, the test efficiency, and therefore the recovery rate of Zn and Cu containing the said waste, was very low, unlike tests according to the invention.

It is assumed that the high efficiency obtained with the process according to the invention is due to several factors:

the agglomerates formed are composed of an intimate mix of reagents (Cu and Zn oxides to be treated, reducing agent and accelerator binder agent), unlike a simple mix of powders that would be added to the said liquid metal;

these agglomerates maintain their integrity as agglomerates due to the binder in the said liquid bath, at least long enough for the said reducing agent to reduce Cu and Zn oxides;

contact between the zinc vapor formed and the liquid copper leading to the formation of a brass that can contain up to at least 35% zinc, is optimized due to the open pores of the agglomerates that enable infiltration of liquid copper within the agglomerates and a maximum exchange surface area;

finally, the agglomerates formed may easily be kept in contact with the said liquid metal, unlike a simple mix of powders that tends to rise and float on the surface of the said liquid metal.

It is important to note that the process for treating the zinc ore (calamine) since ancient times was known for being very slow, since the treatment duration could be as long as 24 h.

By comparison, the recycling process according to the invention is fairly fast.

Furthermore, it should be noted that the process according to the invention can result in brasses that contain up to at least 35% of zinc by weight, whereas the calamine process apparently cannot produce brass with more than 30% of zinc by weight.

According to the applicant's studies, it appears advantageous to:

add the agglomerates into the copper or liquid brass in order to reduce the cycle time and limit zinc losses by vaporization, rather than is subsequently increase the temperature of the copper or solid brass and agglomerates;

dissociate the copper or brass melting furnace and the treatment reactor that will not necessarily use the same technology, the reactor allowing continuous or semi-continuous operation, considering the speed of the reaction within the framework of the invention;

in the case of a copper bath, be able to accompany its fusion and/or have it followed by a pyrometallurgical refining treatment, which would make it possible to load secondary copper materials.

In conclusion, this type of approach would make it possible to produce brass solely from secondary materials to be recycled. Minor impurities, Pb, Fe, Sn, etc., are not a nuisance since the contents of these elements vary between 0.1 and 3% by weight, for example in screw cutting brasses.

The melting furnace and the processing reactor may be grouped together, but this is not the ideal configuration.

The treatment furnace is called the treatment reactor since the reduction reaction is exothermic, so that energy input to this reactor can be limited or even eliminated. This will be even easier if the thermal insulation of the reactor is well adapted.

DESCRIPTION OF THE PREFERRED EMBODIMENTS

Figure 1:
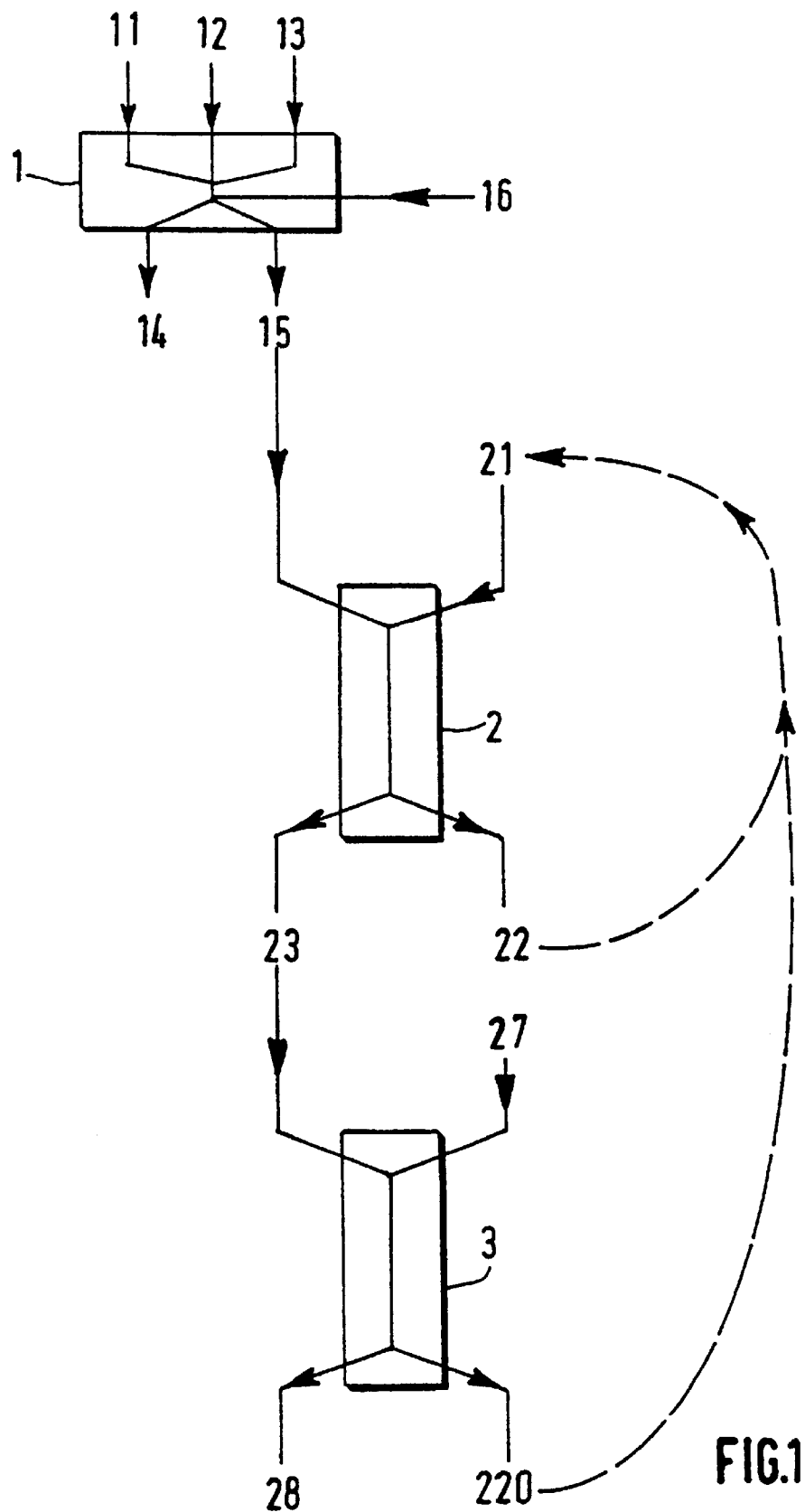
FIG. 1 is a schematic diagram of the process for recycling brass foundry waste according to the invention.

This line is composed of three furnaces: a copper or brass melting furnace capable of a pyrometallurgical refining treatment (1), a treatment reactor (2) and a holding and casting furnace (3).

The furnace (1) and reactor (2) are designed for optimum mass and heat exchange dynamics, for example by vigorous stirring of the contents with the creation of "fresh" exchange surfaces at all times. Techniques used for rotary or pneumatic furnaces, or furnaces equipped with electromagnetic mixing systems, are well adapted. The contents (11) of the furnace (1) are composed mostly of waste. Oxidizing gas (12) or air or air+oxygen can be injected, and a slag (13) can be added, to form an oxidized copper bath. There is a dross removal system to separate the liquid metal (15) and the dross (14).

The liquid metal (15) is transferred from the furnace (1) to the treatment reactor (2) in which the atmosphere can be controlled. When the liquid metal is an oxidized copper, injection of an deoxidizing agent (16) into the furnace (1) before transfer is one way of controlling the degree of oxidation of the liquid metal. The mix to be treated is also added into the reactor (2) in the form of agglomerates (21), this mix being composed of three components—finely ground waste (24) to be recycled containing zinc and copper in oxidized form, an excess of reducing agent (25) in the divided state, and a binder (26) which usually performs a double function providing mechanical stabilization for cohesion of the said agglomerates, and acting as a reduction reaction accelerator.

After being agglomerated in the form of pellets, agglomerates or other form, this mix (21) is added into the middle of the liquid copper (15). The reduction reaction in the reactor (2) produces brass (23) that can contain more than 35% zinc as a function of the required product, and waste (22), dross and flue-dust which are then treated in turn.

The brass (23) is transferred into a holding and casting furnace (3) to form brass products (28), waste (220), dross and flue-dust which are also recycled and treated.

Figure 1A:
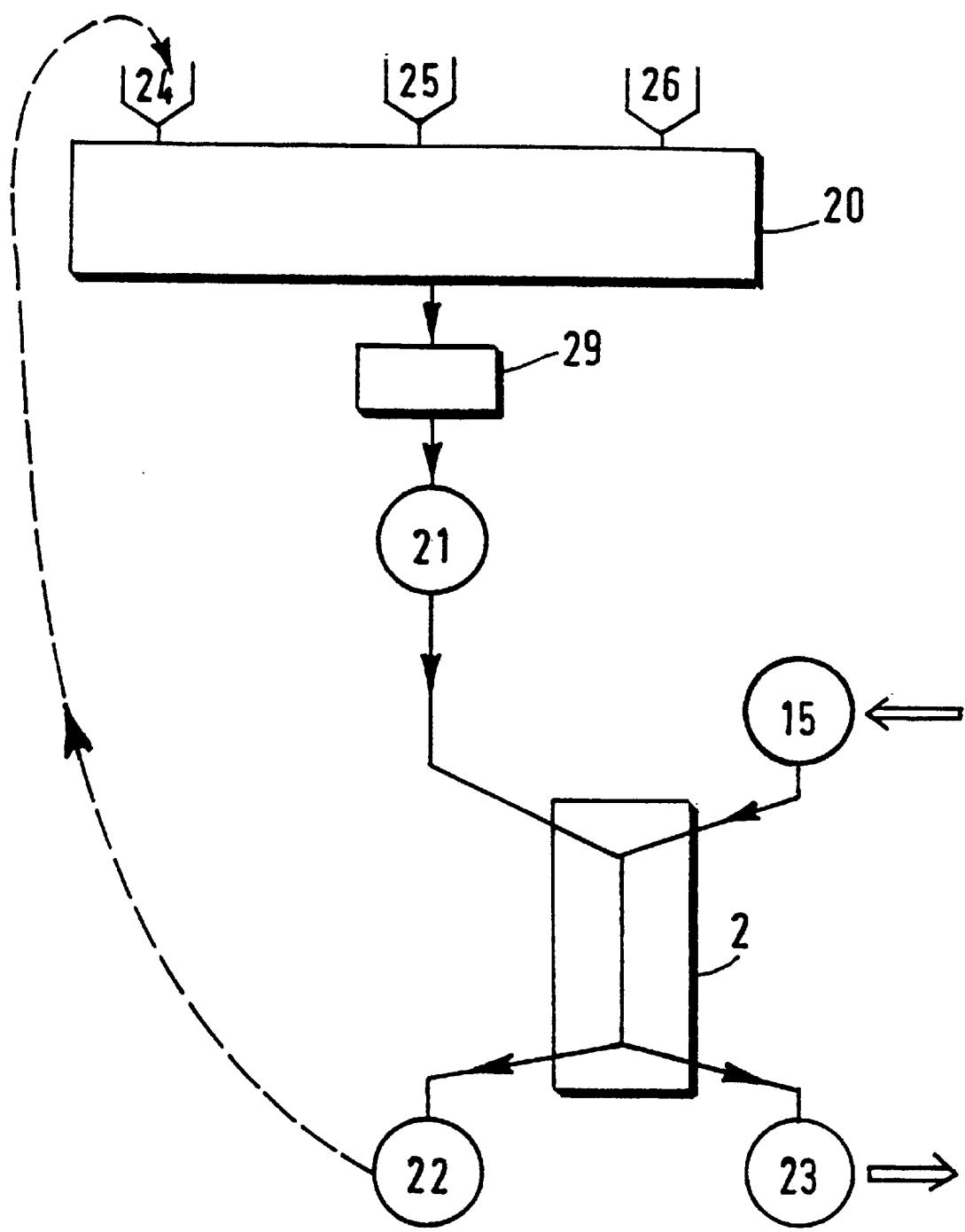
FIG. 1a is a schematic diagram of material flow in a portion of the process shown in FIG. 1.

FIG. 1a diagrammatically shows the formation of agglomerates (21) from the mix (20) of dust and flue-dust to be recycled (24), the reducing agent (25) and the binder (26) treated in the bonder (29), then the treatment of the said agglomerates (21) within the treatment reactor (2) containing liquid metal (15), which leads to the formation of a brass (23) and waste to be recycled (22).

Figure 2:
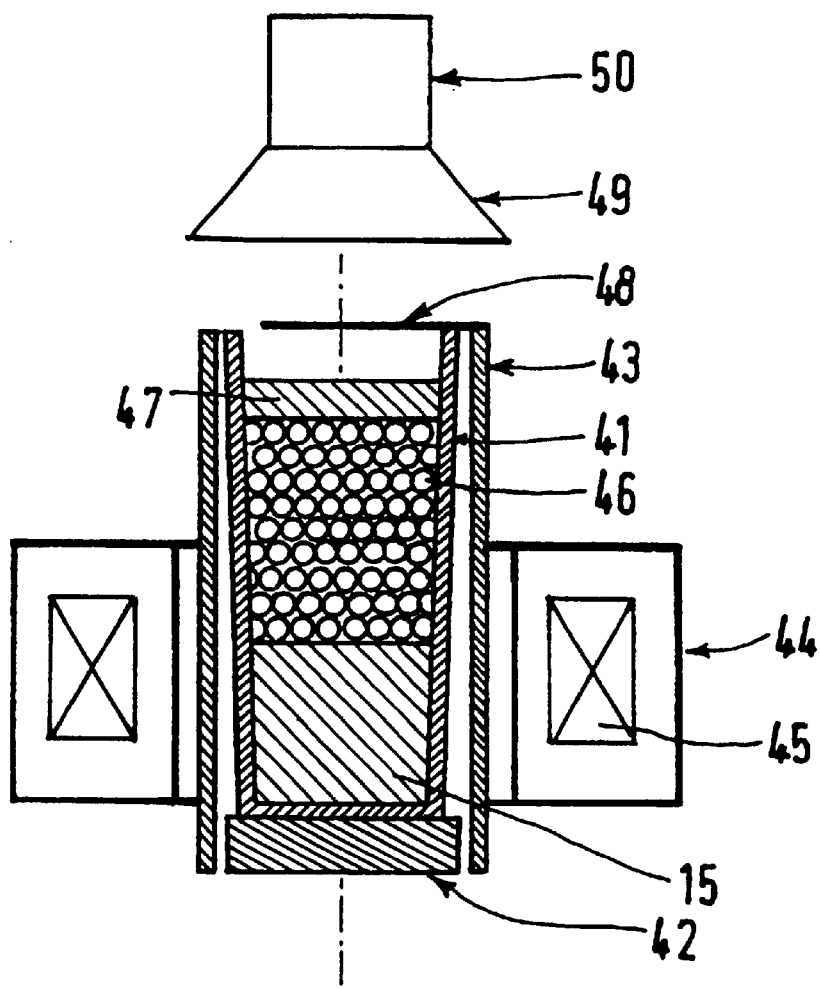
FIG. 2 is a vertical cross-sectional view of a treatment reactor used in the process of the invention.

FIG. 2 shows a vertical section through the treatment reactor (2) used for the tests. It comprises a crucible (41) placed on a refractory support (42) placed inside a protective tube (43), itself centered with respect to the induction coil (45) and its cover (44).

The crucible contains the copper or brass metal bath (15), agglomerates (21) and a charcoal cover (47). The crucible is covered by a cover made of refractory material (48). Flue-dust is collected by an intake hood (49) and is transported through a duct (50).

Figure 3:
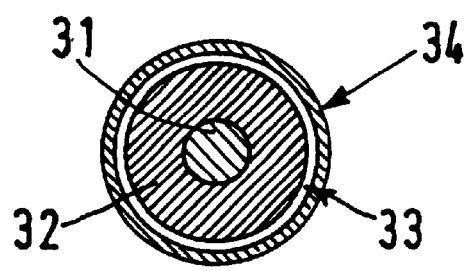
FIG. 3 is a cross-sectional view of an agglomerate formed in the process of the invention.

FIG. 3 shows a sectional view of an agglomerate (46) composed of ZnO+C (zinc oxide+reducing agent) after 15 minutes of reaction in a copper bath (15). It is composed of four zones as follows, working from the inside towards the outside:

a central core (31) not yet modified, of ZnO+C;

a powder layer (32) of ZnO+C+Cu, the Cu (15) originating from the liquid metal bath;

a brass layer (33) formed during the 15 minutes of reduction;

and finally, an external copper layer (34).

According to the invention, the solid waste (24) can contain variable contents of Zn and Cu, with 10 to 95% of Zn, and 2 to 60% of Cu. Two waste families are concerned here:

a) the fine fraction of dross with a content by weight of Zn preferably between 20 and 60%, and a content by weight of Cu preferably between 5 and 20%;

b) flue-dust with a content by weight of Zn preferably between 50 and 80%, and a content by weight of Cu preferably between 2 and 10%.

The contents mentioned above are not limited by technical considerations related to the process according to the invention; they simply correspond to zinc and copper contents normally found in dross and flue-dust to be recycled. However, in the case of waste with a low zinc and copper content, it may be technically feasible to recycle this type of waste using the process according to the invention, but in practice it is not very cost effective.

According to the invention, the said mix (20) defined in step a) of the process comprises at least the quantity of reducing agent(25) necessary for reduction of the Cu and Zn oxides contained in the said waste (24).

The said mix (20) comprises the necessary and sufficient quantity of binder to obtain a solid easily handled agglomerate (21). The said binder is usually a liquid product, possibly with high viscosity at the temperature at which the said agglomerates are formed (21), by compacting the said mix (20) in the form of pellets, agglomerates or another form.

The said binder (26) may be chosen such that, apart from its action stabilizing and providing mechanical cohesion for the said agglomerates, it acts as a catalyst to accelerate the said reduction in step c) of the process.

For guidance, the said binder (26) may be chosen from the following:

a polar liquid, preferably water;

a solution or an emulsion, or a dispersion of a polar liquid (preferably water) with one or several compounds chosen among fatty acids or salts of fatty acids, alkaline bases and alkaline earths (soda, potassium, lime, etc.), sugar and starch;

a liquid or solid hydrocarbon, an organic resin or pitch with a high carbon content.

Preferably, alkaline bases or alkaline earths are used which have the advantage that they have a catalyst action that accelerates the reaction reducing copper and zinc oxides.

The said reducing agent (25) according to the invention contains carbon and is chosen from charcoal, coke, smoke black, carbon black, graphite, and if necessary is crushed into the divided solid state. This reducing agent (25) acts as a fuel, which limits the addition of external energy to the reactor (2).

Typically, the said agglomerate (21) comprises 40 to 70% of waste (24), 15 to 50% of reducing agent (25) and 5 to 35% of binder (26), by weight.

According to the invention, it may be advantageous if a heat treatment is applied to the said agglomerates (21) during the agglomerating phase before they are added into the said treatment reactor (2), in order to:

eliminate any water contained in the said binder (26) and/or the said reducing agent (25), at a temperature exceeding 100° C.;

decompose the part of the said binder (26) and/or the said reducing agent (25) that can be broken down at a temperature of about 400° C.;

and sinter the agglomerate (21) and reinforce its strength and mechanical cohesion, at a temperature close to 400° C.

Preferably, the temperature and duration of the said heat treatment are chosen to produce an agglomerate (21) with open pores to enable reduction of oxides contained in the said waste (24) in the middle of the liquid metal (15) and direct gas collection of the formed zinc, by the said liquid metal (15) that has infiltrated into the middle of the said agglomerate (21).

The said liquid metal (15) may be copper (possibly oxidized), or a CuZn brass with a zinc content lower than the required final content.

The said liquid metal (15) contained in the said treatment reactor (2) in step c) of the process may be added into the said furnace in the liquid state, and in oxidized form in the case of copper.

The said liquid metal is prepared in a refining furnace (1) supplied by the said treatment reactor (2).

The said agglomerates (21) may be injected into the said treatment reactor (2) by dropping them or pneumatically for an induction or cupola type furnace. The agglomerates may also be added through electrodes in the case of an arc furnace.

An accessory may be added for stirring the contents of the treatment reactor (2) in order to accelerate the reaction dynamics.

In general, the said liquid metal (15) and the said agglomerates (21) are covered by a blanket (48) of charcoal or an suitable flux in order to:

a—reduce zinc losses;

b—refine the brass formed;

c—accelerate reactions by displacing thermodynamic equilibriums.

According to one embodiment of the invention, the said binder (26) may be chosen so that it is also the said reducing agent (25), the same product performing the separate functions of the said binder and the said reducing agent, for example by using a pitch or a tar.

Another purpose of the invention is the products obtained with a brass made using the process described above.

EXAMPLE EMBODIMENTS

All tests were carried out inside the treatment reactor (2) shown and described in FIG. 2, with a maximum capacity of 10 kg (weight of brass that can be made in each test).

The tests were carried out starting from waste (24) consisting of dross (C) or flue-dust (F).

The Zn content of dross (C) is 40% and its Cu content is 10%.

The Zn content of flue-dust is 70% and its Cu content is 2%.

The agglomerates (21) were formed by kneading the said waste (24) in the presence of the said binder (26) and the said reducing agent (25) and passing the kneaded mixed mass through a pellet production machine forming approximately spherical agglomerates with a diameter of 5 to 20 mm, or by extruding the kneaded mix in the form of cylindrical pellets with a length and diameter of a few centimeters. The agglomerate formed (21) have open pores.

In all cases, the reducing agent (25) is composed of finely ground charcoal (particles typically smaller than 0.5 mm).

Since the binder (25) is composed of water for tests 1 to 3, an aqueous solution of 10% soda for tests 4 to 6 (denoted + in the following table), plus 2% by weight of sugar (saccharose denoted ++ in the following table) in the case of test 6. The open pores ratio of ready-to-use agglomerates varied between 40 and 75%.

These agglomerates were dried in a furnace at a temperature of 125° C. to eliminate all water added by the said binder, and were then pneumatically added into the treatment furnace (2) containing the said metallic bath (15) and covered by a charcoal blanket.

| TEST No. | 1 | 2 | 3 | 4 | 5 | 6 |
|---|---|---|---|---|---|---|
| Metal bath (15) | Copper Cu | Brass CuZn10 | Brass CuZn25 | Copper Cu | Brass CuZn25 | Copper Cu |
| Mass (kg) | 4.2 | 4.7 | 5.6 | 4.2 | 5.6 | 1.6 |
| Temperature (° C.) | 1100 | 1060 | 1000 | 1090 | 970 | 1085 |
| Agglomerate (21) | | | | | | |
| Waste | F | F | F | F | F | C |
| Binder | water | water | water | water+ | water+ | water+ + |
| Treatment duration | 4 h | 1 h | 2 h 30 | 1 h 45 | 1 h 30 | 1 h 40 |
| Alloy obtained | | | | | | |
| Weight (kg) | 5.2 | 5.8 | 5.7 | 6.3 | 6.2 | 2.1 |
| % Zn | 23.3 | 21.6 | 29.4 | 34.3 | 34.2 | 18.0 |
| Test efficiency % | 60.8 | 52.9 | 68.7 | 78.7 | 80.9 | 45 |

Therefore, these tests demonstrated that:
- brass foundry waste (flue-dust and dross) can be recycled;
- the brass obtained can contain more than 30% by weight of Zn;
- recycling is possible using a pure copper or brass metallic bath;
- the presence of NaOH in the binder improves the recycling efficiency (comparison between test 4 and test 1, test 5 and test 3).

The analysis of the brass obtained and dross formed during tests with soda showed that sodium is present in all dross. Therefore, there is no reason not to use the brass obtained using the process according to the invention.

During these tests, analyses of CO and $CO_2$ gases were carried out on flue-dust samples. These analyses confirmed that the waste reduction reaction took place, and established that a thermodynamic balance was achieved. During these tests, typically spherical agglomerates were taken from the treatment reactor (2) to analyze progress in waste reduction. FIG. 3 shows a sectional view of the various zones obtained after 15 minutes of treatment in test 4.

These various zones demonstrate diffusion of copper from the metallic bath into agglomerates during treatment (46), to meet gaseous zinc produced locally. This is the reason why the agglomerate must have open pores in order to facilitate this phenomenon. COMPARATIVE TESTS Comparative tests were carried out, but with no binder. In these tests, waste and the corresponding quantity of reducing agent were mixed, and this mix was added into a liquid metal bath.

The result was a low recovery efficiency (less than 15% by weight) with the formation of brass with a low zinc content.

Therefore, these tests show that agglomerates of waste and reducing agents have to be formed, and that these agglomerates must maintain their integrity throughout the brass formation period.

The brass foundry waste recycling process has advantages compared with conventional systems used in the past. These advantages are as follows:
- the process according to the invention is a pyrometallurgical recycling process that produces self-recycling waste—at least provided that the Cu/Zn content of this waste justifies economic recycling, in comparison with conventional hydrometallurgical processes that produce liquid effluents that are very difficult to control and expensive to reprocess;
- this process can treat waste on the site on which it is produced, and therefore eliminates the problem of transporting dangerous or potentially polluting materials;
- finally, this process naturally forms part of a brass production line.

Therefore, the process according to the invention is a particularly economic recycling process (recovery of metals present in waste, limitation of transport and storage costs, etc.), and is an ecological process for recycling waste (dross and flue-dust) produced by brass foundries.

What is claimed is:

1. Recycling process for zinc-rich solid waste containing zinc oxide, Cu oxides and impurities normally present in brass, comprising the steps of:
    a) forming a mixture of the waste with a finely divided solid reducing agent and a binder;
    b) compacting the mixture as agglomerates with open pores;
    c) adding the agglomerates into a treatment reactor containing a bath of liquid copper or brass metal, in which the zinc and copper oxides are reduced;
    d) obtaining in the treatment reactor after the reduction, a new brass in liquid form and a new waste;
    e) transferring the new liquid brass into a fusion and casting furnace, and optionally adjusting its composition therein;
    f) casting the new liquid brass in the casting furnace to form a product; and
    g) recovering any waste present in the treatment reactor and the casting furnace and recycling said waste according to said steps a to f.

2. The process of claim 1, wherein the solid waste contains, by weight, 10 to 95% of Zn and 2 to 60% of Cu.

3. The process of claim 1, wherein the solid waste comprises a dross containing, by weight, 20 to 60% of Zn and 5 to 20% of Cu.

4. The process of claim 1, wherein the solid waste comprises a flue dust containing, by weight, 50 to 80% of Zn and 2 to 10% of Cu.

5. The process of claim 1, wherein the mixture comprises at least an amount of reducing agent necessary for reduction of said zinc and copper oxides.

6. The process of claim 5, wherein the mixture comprises an amount of the binder necessary to obtain an agglomerate which maintains its integrity in the treatment reactor for a time necessary for said reduction.

7. The process of claim 6, wherein the binder stabilizes and provides mechanical cohesion for the agglomerates, and acts as a catalyst to accelerate the reduction.

8. The process of claim 7, wherein the binder is selected from the group consisting of:
- a polar liquid;
- a solution, an emulsion or a dispersion comprising a polar liquid and at least one compound selected from the group consisting of fatty acids, salts of fatty acids, alkali and alkaline earth compounds, sugar and starch; and
- a liquid or solid hydrocarbon, an organic resin or pitch with a high carbon content.

9. The process of claim 8, wherein the polar liquid is water.

10. The process of claim 1, wherein the reducing agent contains carbon and is selected from the group consisting of charcoal, coke, smoke black, carbon black and graphite.

11. The process of claim 1, wherein the agglomerates comprise, by weight, 40 to 70% of the waste, 15 to 50% of the reducing agent and 5 to 35% of the binder.

12. The process of claim 1, additionally comprising heat treating the agglomerates before adding into the treatment reactor, in order to:
- eliminate any water contained in the binder and the reducing agent, at a temperature exceeding 100° C.;
- decompose a portion of the binder and the reducing agent that can be broken down at a temperature of about 400° C.; and
- sinter the agglomerates and reinforce strength and mechanical cohesion thererof, at a temperature close to 400° C., thereby obtaining open pores in the agglomerates.

13. The process of claim 12, wherein the heat treatment has a temperature and duration sufficient to produce an agglomerate which enables reduction of oxides contained in the waste within the liquid copper or brass and direct collection zinc vapor formed by the liquid copper or brass which infiltrates within the agglomerates.

14. The process of claim 1, wherein the liquid copper or brass comprises copper which is optionally oxidized, or a CuZn brass with a zinc content lower than a predetermined final zinc content.

15. The process of claim 14, wherein the oxidized copper is prepared in a refining furnace upstream of the treatment reactor.

16. The process of claim 1, wherein the agglomerates are injected into the treatment reactor by dropping into the reactor, pneumatically in an induction or cupola type reactor, or through electrodes in an arc reactor.

17. The process of claim 1, additionally comprising stirring the liquid copper or brass in the treatment reactor in order to accelerate reaction dynamics.

18. The process of claim 1, wherein the liquid copper or brass and the agglomerates are covered by a blanket of charcoal or a flux in order to reduce zinc losses, refine the brass formed, and accelerate reactions taking place.

19. The process of claim 1, wherein a single compound is both the binder and the reducing agent.

* * * * *